US012610199B2

(12) United States Patent
Fukamachi

(10) Patent No.: US 12,610,199 B2
(45) Date of Patent: Apr. 21, 2026

(54) PRESSURE WAVE GENERATING ELEMENT AND METHOD FOR PRODUCING THE SAME

(71) Applicant: Murata Manufacturing Co., Ltd., Nagaokakyo (JP)

(72) Inventor: Kohei Fukamachi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 304 days.

(21) Appl. No.: 18/355,828

(22) Filed: Jul. 20, 2023

(65) Prior Publication Data

US 2024/0048917 A1 Feb. 8, 2024

Related U.S. Application Data

(63) Continuation of application No. PCT/JP2022/004504, filed on Feb. 4, 2022.

(30) Foreign Application Priority Data

Feb. 19, 2021 (JP) ................................ 2021-025464

(51) Int. Cl.
*H04R 23/00* (2006.01)
*H04R 7/04* (2006.01)
*H04R 31/00* (2006.01)

(52) U.S. Cl.
CPC ............ *H04R 23/002* (2013.01); *H04R 7/04* (2013.01); *H04R 31/003* (2013.01); *H04R 2307/027* (2013.01); *H04R 2307/029* (2013.01)

(58) Field of Classification Search
CPC ...... H04R 23/002; H04R 7/04; H04R 31/003; H04R 2307/027; H04R 2307/029
See application file for complete search history.

(56) References Cited

U.S. PATENT DOCUMENTS

| | | | |
|---|---|---|---|
| 9,968,892 | B2 | 5/2018 | Chu et al. |
| 10,582,310 | B1 | 3/2020 | Choe et al. |
| 11,154,821 | B2 | 10/2021 | Kas et al. |
| 2009/0268556 | A1 | 10/2009 | Jiang et al. |
| 2013/0092622 | A1 | 4/2013 | Kas et al. |
| 2016/0184778 | A1 | 6/2016 | Chu et al. |
| 2017/0007741 | A1 | 1/2017 | D'Lima et al. |

(Continued)

FOREIGN PATENT DOCUMENTS

| | | | |
|---|---|---|---|
| JP | H11300274 | A | 11/1999 |
| JP | 2005256215 | A | 9/2005 |
| JP | 2009296591 | A | 12/2009 |

(Continued)

OTHER PUBLICATIONS

Aliev et al. "Alternative Nanostructures for Thermophones, May 2015". (Year: 2015).*

(Continued)

*Primary Examiner* — Sunita Joshi
(74) *Attorney, Agent, or Firm* — ArentFox Schiff LLP

(57) ABSTRACT

A pressure wave generating element that includes a support and a fiber layer on the support and constructed to generate heat by energization. The fiber layer is in the form of a fiber membrane having an average pore diameter in a range of 0.1 to 1.0 μm, and the fiber layer includes one or more fibers having a surface at least partly provided with a metal coating.

20 Claims, 3 Drawing Sheets

(56) References Cited

U.S. PATENT DOCUMENTS

2022/0174425 A1 6/2022 Fukamachi

FOREIGN PATENT DOCUMENTS

| | | | | | |
|---|---|---|---|---|---|
| JP | 2013187845 | A | * | 9/2013 | |
| JP | 2014-506190 | A | | 3/2014 | |
| JP | 2014-514958 | A | | 6/2014 | |
| JP | 2018133625 | A | | 8/2018 | |
| WO | WO-2018146951 | A1 | * | 8/2018 | ............. G01N 29/24 |
| WO | 2021039169 | A1 | | 3/2021 | |

OTHER PUBLICATIONS

Aliev et al., "Alternative Nanostructures for Thermophones," ACS Nano, Mar. 8, 2015, vol. 9, No. 5, pp. 4743-4756.

International Search Report in PCT/JP2022/004290, mailed Apr. 12, 2022, 3 pages.

International Search Report in PCT/JP2022/004504, mailed Mar. 22, 2022, 3 pages.

* cited by examiner

PRESSURE WAVE GENERATING ELEMENT AND METHOD FOR PRODUCING THE SAME

CROSS REFERENCE TO RELATED APPLICATIONS

The present application is a continuation of International application No. PCT/JP2022/004504, filed Feb. 4, 2022, which claims priority to Japanese Patent Application No. 2021-025464, filed Feb. 19, 2021, the entire contents of each of which are incorporated herein by reference.

TECHNICAL FIELD

The present invention relates to a pressure wave generating element that generates a pressure wave by periodically heating air. In addition, the present invention also relates to a method for producing the pressure wave generating element.

BACKGROUND ART

A pressure wave generating element is referred to as a thermophone, and as an example, a resistor layer is provided on a support. When a current flows through the resistor, the resistor generates heat, and the air in contact with the resistor is thermally expanded. Subsequently, when energization is stopped, the expanded air contracts. Such a periodic heating generates a sound wave. When a drive signal is set to an audible frequency, it can be used as an acoustic speaker. When the drive signal is set to an ultrasonic frequency, it can be used as an ultrasonic source. Since such a thermophone does not use a resonance mechanism, it is possible to generate the sound wave having a wide band and a short pulse. Since the thermophone generates the sound wave after converting electrical energy into thermal energy, there is a demand for improved energy conversion efficiency and sound pressure.

In Patent Document 1, by providing a carbon nanotube structure in which a plurality of carbon nanotubes are arranged in parallel to each other as the resistor, a surface area in contact with air is increased, and a heat capacity per unit area is reduced. In Patent Document 2, a silicon substrate is used as a heat radiation layer and porous silicon with low thermal conductivity is used as heat insulating layer to improve insulating characteristics.

Patent Document 1: Japanese Patent Application Laid-Open No. 2009-296591

Patent Document 2: Japanese Patent Application Laid-Open No. H11-300274

SUMMARY OF THE INVENTION

In Patent Document 1, reduction of the heat capacity is examined by using carbon nanotubes for a heating layer. Although the carbon nanotube have been put to practical use, it is likely to be problematic in practical use because of their high cost and difficulty in handling in production. In addition, since the resistivity ($10^{-5}$ to $10^{-2}$ Ω cm) of the carbon nanotube is higher than that of a metal material ($10^{-6}$ Ω cm), it is necessary to drive an element at a high voltage in order to apply the same electric power.

It is an object of the present invention to provide a pressure wave generating element having improved sound pressure and suitable electrical resistance. It is also an object of the present invention to provide a method for manufacturing such a pressure wave generating element.

A pressure wave generating element according to one aspect of the present invention includes: a support; and a fiber layer on the support and constructed to generate heat by energization, the fiber layer being in the form of a fiber membrane having an average pore diameter within a range of 0.1 to 1.0 μm, and the fiber layer including one or more fibers having a surface at least partly provided with a metal coating.

Further, a pressure wave generating element according to one aspect of the present invention includes: a support; and a fiber layer on the support and constructed to generate heat by energization, the fiber layer being in the form of a fiber membrane having a porosity in a range of 70% to 95%, and the fiber layer includes one or more fibers having a surface at least partly provided with a metal coating.

A method for manufacturing a pressure wave generating element according to another aspect of the present invention includes: forming a fiber membrane on a support, the fiber membrane having a composite fiber formed by spinning using an electrospinning method where two or more kinds of solutions having different concentrations are simultaneously spun to form the fiber membrane made of the composite fiber; and applying a metal coating on the fiber membrane to form a fiber layer.

The method for manufacturing a pressure wave generating element according to another aspect of the present invention includes: forming a fiber membrane on a support, the fiber membrane having a composite fiber formed by spinning using an electrospinning method where two or more types of materials are simultaneously spun to form the fiber membrane made of the composite fiber; and applying the metal coating on the fiber membrane to form the fiber layer.

Further, the pressure wave generating element according to one aspect of the present invention includes: a support; and a fiber layer on the support and constructed to generate heat by energization, wherein the fiber layer includes a fiber having a surface thereof at least partly provided with a metal coating, and a penetration depth of the metal coating into the fiber layer is 1 μm or more.

In a pressure wave generating element according to the present invention, since a fiber layer includes a fiber having a surface at least partly provided with a metal coating, the surface area in contact with air increases, so that a sound pressure is improved. In addition, by using a metal material, an electric resistance of the fiber layer can be set to an appropriate value. The fiber layer is composed of a fiber membrane having an average pore diameter in the range of 0.1 to 1.0 μm. Alternatively, the fiber layer is composed of a fiber membrane having a porosity in the range of 70% to 95%. As a result, a specific surface area of the fiber layer increases, an acoustic conversion efficiency can be enhanced, and the sound pressure is improved.

The method of manufacturing the pressure wave generating element according to the present invention can realize the fiber layer having a large surface area in contact with air and having appropriate electric resistance. In addition, by forming the fiber membrane made of a composite fiber, a pore diameter and a porosity of the fiber layer are increased, the acoustic conversion efficiency can be enhanced, and the sound pressure is improved.

DETAILED DESCRIPTION OF THE INVENTION

Figure 1:
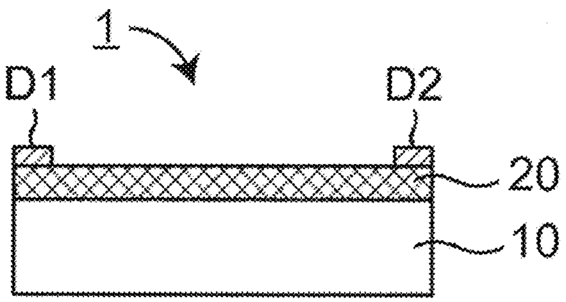
FIG. 1 is a sectional view illustrating an example of a pressure wave generating element according to a first embodiment of the present invention.

A pressure wave generating element according to one aspect of the present invention includes: a support; and a fiber layer on the support and constructed to generate heat by energization, the fiber layer being in the form of a fiber membrane having an average pore diameter within a range of 0.1 to 1.0 μm, and the fiber layer including one or more fibers having a surface at least partly provided with a metal coating.

According to this configuration, the fiber layer comprises one or more fibers having at least partly provided on the surface thereof the metal coating. Therefore, the surface area in contact with air increases, and the sound pressure with respect to an unit input power is improved. The fiber may be arranged in the form of a nonwoven, woven, knitted or a mixture thereof, wherein the cavities around the fiber communicate with one another to ensure air permeability between the internal cavity and the external space. Therefore, the contact area between a porous structure composed of fibers and air becomes significantly increased as compared to a non-porous and smooth surface. The heat transfer efficiency from the fiber layer to air is consequently increased, and the sound pressure can be improved.

In addition, by applying the metal coating to at least the part of the one or more fibers, the electric resistance of the fiber layer can be easily set to an appropriate value according to the adjustment of the coating film thickness and the selection of the coating material. In this way, a desired electric resistance is obtained, and a drive voltage is optimized.

When, for example, a low thermal conductive material is used as the one or more fibers, thermal conduction from the fiber layer to the support can be suppressed. Therefore, the temperature change on the surface of the fiber layer increases, and the sound pressure with respect to an unit input power is improved. Since the fiber layer containing such fibers has a porous structure, it is not necessary to introduce a heat insulating layer for the sound pressure as in Patent Document 2.

The fiber layer is in the form of a fiber membrane having an average pore diameter in the range of 0.1 to 1.0 μm. As a result, a specific surface area of the fiber layer increases, an acoustic conversion efficiency can be enhanced, and the sound pressure is improved.

In the present invention, the one or more fibers preferably have a fiber diameter of 1 nm to 100 nm, and the fiber membrane preferably has an average pore diameter of 0.2 to 1.0 μm. As a result, a specific surface area of the fiber layer increases, an acoustic conversion efficiency can be enhanced, and the sound pressure is improved.

Further, a pressure wave generating element according to one aspect of the present invention includes: a support; and a fiber layer on the support and constructed to generate heat by energization, the fiber layer being in the form of a fiber membrane having a porosity in a range of 70% to 95%, and the fiber layer includes one or more fibers having a surface at least partly provided with a metal coating.

As a result, a specific surface area of the fiber layer increases, an acoustic conversion efficiency can be enhanced, and the sound pressure is improved.

In the present invention, the one or more fibers preferably have a fiber diameter of 1 nm to 100 nm, and the fiber membrane has a porosity of 87% to 95%. As a result, a specific surface area of the fiber layer increases, an acoustic conversion efficiency can be enhanced, and the sound pressure is improved.

In the present invention, the one or more fibers preferably includes a first fiber having a first fiber diameter $\Phi 1$ and a second fiber having a second fiber diameter $\Phi 2$ larger than the first fiber diameter ($\Phi 1 < \Phi 2$) (i.e., a composite fiber). As a result, the pore diameter and the porosity of the fiber layer are increased, the acoustic conversion efficiency can be enhanced, and the sound pressure is improved.

In the present invention, it is preferable that the first fiber diameter $\Phi 1$ is within a range of $1\ \text{nm} \leq \Phi 1 \leq 100$ nm, and the second fiber diameter $\Phi 2$ is within a range of $100\ \text{nm} \leq \Phi 2 \leq 2000$ nm. As a result, the pore diameter and the porosity of the fiber layer are increased, the acoustic conversion efficiency can be enhanced, and the sound pressure is improved.

In the present invention, it is preferable that the fiber layer includes a bead, and the bead is sandwiched between the one or more fibers. As a result, the pore diameter and the porosity of the fiber layer are increased, the acoustic conversion efficiency can be enhanced, and the sound pressure is improved.

In the present invention, it is preferable that the thickness of the metal coating increases as the distance from the support increases.

According to this configuration, while heat generation on the support side inside the fiber layer is suppressed, heat generation on the side opposite to the support can be enhanced. Therefore, while heat conduction from the fiber layer to the support is suppressed, the efficiency of heating air is improved, and the sound pressure with respect to a unit input power is improved.

In the present invention, the fiber layer is preferably in the form of a nonwoven fabric. As a result, the specific surface area, the pore diameter, the porosity, and the like of the fiber layer are increased, so that the acoustic conversion efficiency can be enhanced and the sound pressure is improved.

A method for manufacturing a pressure wave generating element according to another aspect of the present invention includes: forming a fiber membrane on a support, the fiber membrane having a composite fiber formed by spinning using an electrospinning method where two or more kinds of solutions having different concentrations are simultaneously spun to form the fiber membrane made of the composite fiber; and applying a metal coating on the fiber membrane to form a fiber layer.

The method for manufacturing a pressure wave generating element according to another aspect of the present invention includes: forming a fiber membrane on a support, the fiber membrane having a composite fiber formed by spinning using an electrospinning method where two or more types of materials are simultaneously spun to form the fiber membrane made of the composite fiber; and applying the metal coating on the fiber membrane to form the fiber layer.

According to these methods, the fiber layer becomes comprising a fiber at least partly provided with the metal coating on the surface, and acts as a heater. Therefore, the surface area in contact with air increases, and the sound pressure with respect to an unit input power is improved. In addition, the fiber layer having appropriate electric resistance can be easily realized.

Moreover, by using the electrospinning method, the fiber having a diameter in the range of 1 nm to 2000 nm, for example, nanofibers, submicron fibers, micron fibers, and the like can be realized.

In addition, the fiber layer having a large surface area in contact with air and having appropriate electric resistance can be realized. Further, by forming the fiber membrane made of the composite fiber, the pore diameter and the porosity of the fiber layer are increased, the acoustic conversion efficiency can be enhanced, and the sound pressure is improved.

Further, the pressure wave generating element according to one aspect of the present invention includes: a support; and a fiber layer on the support and constructed to generate heat by energization, wherein the fiber layer includes a fiber having a surface thereof at least partly provided with a metal coating, and a penetration depth of the metal coating into the fiber layer is 1 μm or more.

As a result, it is possible to obtain the pressure wave generating element having the large sound pressure with respect to an unit input power.

First Embodiment

FIG. 1 is a sectional view illustrating an example of pressure wave generating element 1 according to a first embodiment of the present invention.

The pressure wave generating element 1 includes a support 10, a fiber layer 20, and a pair of electrodes D1 and D2. The support 10 is formed of a semiconductor such as silicon or an electrical insulator such as glass, ceramic, or polymer. A heat insulating layer having a lower thermal conductivity than the support 10 may be provided on the support 10, so that heat dissipation from the fiber layer 20 to the support 10 can be suppressed. As described later, when fiber layer 20 has a thermal insulation function, the above-described thermal insulation layer may be omitted.

The fiber layer 20 is provided on the support 10. The fiber layer 20 is formed of a conductive material, is electrically driven to generate heat by current flow, and emits a pressure wave due to periodic expansion and contraction of air. The pair of electrodes D1 and D2 is provided on both sides of the fiber layer 20. The electrodes D1 and D2 have a single-layer structure or a multilayer structure made of a conductive material.

In the present embodiment, the fiber layer 20 includes a fiber having a surface at least partly provided with a metal coating. Therefore, the surface area in contact with air increases, and a sound pressure is improved. By applying the metal coating to the fiber, the electric resistance of the fiber layer 20 can be set to an appropriate value according to the adjustment of the coating film thickness and selection of the coating material.

The fiber may be arranged directly on the support 10 or may be arranged via an adhesive layer, such as a polymer material.

Figure 2:
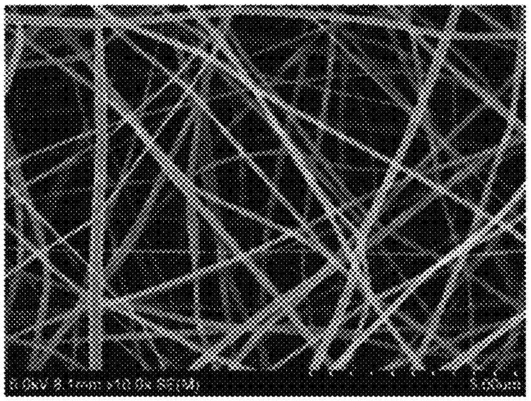
FIG. 2 is an electron micrograph showing a surface of a fiber layer.

FIG. 2 is an electron micrograph showing a surface of the fiber layer 20. Here, the case where the fiber are randomly oriented and bonded or intertwined by a thermal, mechanical, or chemical action to form a sheet is shown. A metal coating is applied to the surface of the fiber.

The fiber layer 20 may be in the form of such the nonwoven fabric, may be in a form of a woven fabric in which warps and wefts are combined, may be in a form of a knitted fabric in which fibers are knitted, or may be in a form of a mixture thereof.

The fiber can be selected from the group consisting of polymer fibers, glass fibers, carbon fibers, carbon nanotubes, metal fibers and ceramic fibers. For example, when a low thermal conductive material such as polymer, glass, or ceramic is used as the fiber, the fiber itself has a thermal insulation function, so that heat conduction from the fiber layer to the support can be suppressed. Therefore, the temperature change on the surface of the fiber layer increases, and the sound pressure with respect to an unit input power is improved.

Specific examples of the polymer material include polyimide, polyamide, polyamide imide, polyethylene, polypropylene, acrylic resin, polyvinyl chloride, polystyrene, polyvinyl acetate, polytetrafluoroethylene, liquid crystal polymer, polyphenylene sulfide, polyether ether ketone, polyarylate, polysulfone, polyether sulfone, polyether imide, polycarbonate, modified polyphenylene ether, polybutylene terephthalate, polyethylene terephthalate, polyacetal, polylactic acid, polyvinyl alcohol, ABS resin, polyvinylidene fluoride, cellulose, polyethylene oxide, polyethylene glycol, and polyurethane.

The metal coating is preferably formed of, for example, a metal material such as Au, Ag, Cu, Pt, Rh, Pd, Ru, Ni, Ir, Cr, Mo, W, Ti, or Al, or an alloy containing two or more kinds of these metals. The metal coating may have a single layer structure or a multilayer structure composed of a plurality of materials.

Second Embodiment

Figure 6:
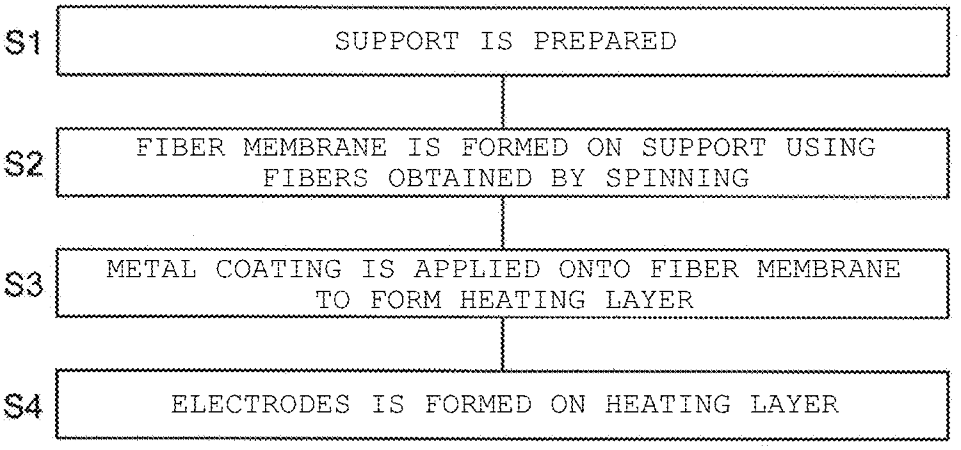
FIG. 6 is a flowchart illustrating an example of a method of manufacturing the pressure wave generating element.

FIG. 6 is a flowchart illustrating an example of a method of manufacturing a pressure wave generating element. First, in step S1, the support 10 is prepared.

Next, in step S2, a fiber membrane is formed on the support 10 using a fiber obtained by spinning. As a spinning method, a melt blowing method, a flash spinning method, a centrifugal spinning method, a melt spinning method, or the like can be employed. Further, a method in which pulp is crushed and processed into a sheet like a cellulose nanofiber can be employed. In particular, when the electrospinning method is used, a nanofiber, a submicron fiber, a micron fiber, or the like can be realized. The spun fiber may be arranged directly on the support 10 in the form of a nonwoven fabric, or may be arranged on the support 10 in the form of a woven fabric combining warp and weft yarns, or in the form of a knitted fabric knitted with the fiber.

Instead of directly spinning the fiber on the support 10, the fiber can be spun on another support, and then the spun fiber can be peeled off and bonded onto the support 10.

In step S2, at the time of spinning, two or more kinds of solutions having different concentrations may be simultaneously spun from a plurality of spinning nozzles to form a fiber membrane made of composite fiber. Higher concentration solutions increase the diameter of the spun fiber, while lower concentration solutions decrease the diameter of the spun fiber. Therefore, when spinning is performed using two or more kinds of solutions having different concentrations, a composite fiber including a plurality of fibers having different fiber diameters is obtained. As a result, the pore diameter and the porosity of the fiber layer are increased, the acoustic conversion efficiency can be enhanced, and the sound pressure is improved.

In step S2, at the time of spinning, two or more different types of materials (for example, polyimide fibers, acrylic fibers, and the like) may be simultaneously spun from a plurality of spinning nozzles to form a fiber membrane made of composite fiber. As a result, various physical properties of the fiber, for example, specific surface area, fineness, specific gravity, mechanical properties, degradability, optical properties, moisture absorption and swelling, thermal properties, combustibility, electrical properties, friction properties, dyeability, and the like can be controlled to desired values. For example, when the specific surface area of the fiber layer increases, the acoustic conversion efficiency can be increased, and the sound pressure is improved.

Next, in step S3, a metal coating is applied onto the obtained fiber membrane to form a fiber layer 20. As a coating method, vapor deposition, sputtering, electrolytic plating, electroless plating, ion plating, atomic layer deposition method, or the like can be employed. As the metal material, those described above can be generally employed.

Next, in step S4, a pair of electrodes D1 and D2 is formed on the obtained fiber layer 20. As a method for forming a membrane of an electrode, vapor deposition, sputtering, electrolytic plating, electroless plating, ion plating, an atomic layer deposition method, printing, spray coating, dip coating, or the like can be employed. The electrode material is preferably a metal material such as Au, Ag, Cu, Pt, Rh, Pd, Ru, Ni, Ir, Cr, Mo, W, Ti, Al, or Sn, or an alloy containing two or more kinds of these metals. The electrode structure may be a single layer structure or a multilayer structure made of a plurality of materials.

EXAMPLES

Example 1

Sample Preparation Method

A pressure wave generating element was produced by the following method (Sample 1 to 5).

A polyamic acid solution prepared using N, N-dimethylacetamide (DMAc) as a solvent was used as a spinning solution. The solution concentration was adjusted to 22 wt %.

Using this solution, polyamic acid fiber was spun on an aluminum foil attached to a peripheral surface of a drum collector by an electrospinning method. The drum collector had a diameter of 200 mm and spinning was carried out while rotating at 100 rpm.

The electrospinning conditions were an applied voltage of 23 kV, a distance of 14 cm between a nozzle and a collector, and a membrane formation time was adjusted so that the thickness of the fiber membrane was about 1 to 80 μm. The obtained polyamic acid fiber was subjected to a heat treatment (imidization) at 300° C. for 2 hours to obtain a polyimide fiber. The fiber diameter of the produced polyimide was 157 nm. Since the polyimide material has heat resistance, a heat treatment process can be applied.

Next, a composite fiber will be described. The polyimide fiber membranes having different porosities and pore diameters were prepared by simultaneously spinning a polyamic acid solution and an acrylic resin solution using a multi-nozzle during electrospinning, and thermally decomposing only acrylic fiber by heat treatment.

The acrylic resin solution was prepared as follows. An acrylic resin solution prepared using N, N-dimethylformamide (DMF) as a solvent was used as a spinning solution. The solution concentration was adjusted to 10 wt % to 25 wt %.

Using a 22 wt % polyamic acid solution and a 10 to 22 wt % acrylic resin solution, polyamic acid fiber and acrylic fiber were simultaneously spun on an aluminum foil attached to a peripheral surface of a drum collector by an electrospinning method using a multi-nozzle. At this time, the discharge amount of the solution was 1: 1. The discharge amount can be adjusted by the discharge speed and the number of nozzles. The drum collector had a diameter of 200 mm and spinning was carried out while rotating at 100 rpm.

The electrospinning conditions were an applied voltage of 23 kV, a distance of 14 cm between a nozzle and a collector, and a membrane formation time was adjusted so that the thickness of the fiber membrane was about 1 to 80 μm. At this time, the fiber diameter of the prepared acrylic resin was 210 nm at a solution concentration of 10 wt %, 615 nm at 15 wt %, 873 nm at 20 wt %, and 1025 nm at 22 wt %. The obtained fiber membrane in which the polyamic acid fiber and the acrylic fiber were mixed was heat-treated at 300° C. for 2 hours to thermally decompose the acrylic fiber and imidize the polyamic acid, thereby obtaining the polyimide fiber. In the case of a polymer material having a low thermal decomposition temperature or melting point, a fiber membrane cannot be obtained when a heat treatment process is applied. As a polyimide material has heat resistance, a heat treatment process can be applied.

Each of the prepared fiber membranes was peeled off from the aluminum foil and adhered onto a Si substrate (support). Adhesion to the substrate can be performed by applying an adhesive such as epoxy to the substrate in advance or using a double-sided tape or the like. As the substrate, a ceramic substrate such as glass, alumina, zirconia, magnesium oxide, aluminum nitride, boron nitride, or silicon nitride, or a flexible substrate such as a PET film or a polyimide film can be used.

Au distributed in the thickness range of 1 to 40 nm was deposited on the fiber membrane formed on the substrate by a sputtering method. As a method for coating a fiber with metal, a method such as a vapor deposition method, an ion plating method, an atomic layer deposition method, or an electroless plating method may be used. As the metal species, Au, Ag, Cu, Pt, Rh, Pd, Ru, Ni, Ir, Cr, Mo, W, Ti, Al, or the like can be used.

Figure 3:
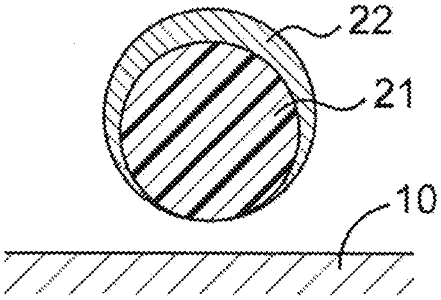
FIG. 3 is a sectional view illustrating a thickness distribution of a metal coating.

The thickness of the metal coating may be uniform or non-uniform in a circumferential direction of the fiber. For example, the thickness may be increased as the distance from the support is increased. The metal coating has a thickness T1 at a position closest to the support side, and has a thickness T2 at a position farthest from the support side, and T1<T2 may be satisfied. In the form of metal coating on the fiber, for example, as shown in FIG. 3, there may be a portion where the metal coating 22 is not applied on a lower portion close to the support 10 on the peripheral surface of the Fiber 21. This makes it possible to enhance heat generation on the side opposite to the support while suppressing heat generation on the support side inside the fiber layer.

The coating state of the metal-coated fiber (sectional image) can be analyzed as follows. For example, a sample is processed by a focused ion beam (FIB), and the state of coating on fibers can be analyzed by observation with a transmission electron microscope (JEM-F200 manufactured by JEOL Ltd.) and element mapping analysis by energy dispersive X-ray spectroscopy.

Figure 4A:
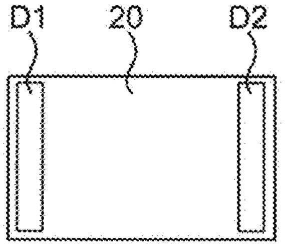
FIGS. 4A and 4B are plan views illustrating an arrangement example of electrodes.
Figure 4B:
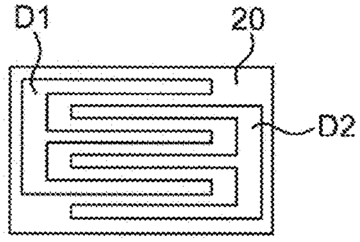

The prepared element was processed so as to have a size of 5 mm×6 mm. A pair of electrodes D1 and D2 was formed on both sides of the sample so as to have a dimension of 4 mm×0.8 mm and an inter-electrode distance of 3.4 mm (FIG. 4A). The laminated structure of the electrode was Ti (10 nm thick), Cu (500 nm thick), and Au (100 nm thick) from the support side. The electrodes D1 and D2 may have a comb-shaped electrode structure as illustrated in FIG. 4B in order to adjust an element resistance.

As a method for forming a film of an electrode, vapor deposition, sputtering, an ion plating method, an atomic layer deposition method, electrolytic plating, electroless plating, spray coating, dip coating, printing, and the like can be employed. As the electrode material, Au, Ag, Cu, Pt, Rh, Pd, Ru, Ni, Ir, Cr, Mo, W, Ti, Al, or the like can be used.

Evaluation Method

1) Acoustic Characteristics (Sound Pressure)

The acoustic characteristics of the pressure wave generating element were measured using a MEMS microphone (SPU0410LR5H manufactured by Knowles). The distance between the pressure wave generating element and the microphone was set to 6 cm, and the evaluation was performed by reading the output voltage of the microphone when the frequency of the drive signal was 60 kHz. An input voltage to the pressure wave generating element was set to 6 to 16 V.

The pressure wave generating element generates a pressure wave by air heating by a heating element. Therefore, the larger the input power, the larger the sound pressure in the same element. In order to determine whether a sound wave can be efficiently generated (acoustic conversion efficiency), it is necessary to compare sound pressures with the same power. As the power increases, the output also increases linearly, and for example, in a case where the acoustic conversion efficiency is good, the ratio of the increase ΔV in the microphone output to the increase ΔW in the power increases. Here, the slope ΔV/ΔW is used as an index of the sound pressure. As a comparison target of the index, the result of Comparative Sample 1 was used.

2) Fiber Diameter

The fiber diameters of the polyimide fiber and the acrylic fiber were measured as follows. The fiber membrane was observed with a scanning electron microscope (S-4800 by Hitachi, Ltd., acceleration voltage 5 kV, 3 k to 120 k times) to obtain an SEM image, and the fiber diameter was measured from the obtained image to calculate the average fiber diameter. Specifically, among a plurality of fibers included in the obtained image, 10 fibers were randomly extracted per visual field except for abnormal fibers, and the extraction was performed for 5 visual fields to sample a total of 50 fibers. The diameters of these fibers were measured, and the average fiber diameter was calculated.

3) Porosity

The porosity of the polyimide fiber membrane was calculated from the following formula.

$$\text{Porosity (\%)}=\{1-(\text{bulk density}\div\text{true density})\}\times 100$$

As another method of calculating the porosity, the porosity can be calculated by a method of repeating sectional processing with FIB and SEM observation to acquire a three-dimensional stereoscopic image. Specifically, FIB processing is performed with HELIOS NANORAB 660i manufactured by FEI, and an SEM image is observed. Subsequently, processing is performed again with 10 nm in the depth direction with the FIB, then the SEM image is observed. By repeating the FIB processing and the SEM observation in this way, SEM images with a depth of 400 nm (41 sheets in total) were obtained. It is possible to construct a 3D stereoscopic image of the fiber layer from these 41 images of SEM and to calculate the porosity.

4) Average Pore Diameter

The average pore diameter (through-hole diameter) of the polyimide fiber membrane was calculated with a Perm-Porometer (CFP-1200 AEL by POROUS MATERIALS INC.). The average through-hole diameter was measured by a half dry method (ASTM E1294-89). Galwick (by POROUS MATERIALS INC., surface tension 15.9 mN/m) was used as a liquid for impregnating the sample. The average pore diameter after metal coating can be estimated from the thickness of the film formed on the fiber, and for example, when a metal having a thickness Y (μm) is coated around a fiber having an average pore diameter X (μm) of the polyimide nonwoven fabric, X-2Y can be calculated as the average pore diameter of the metal-coated fiber.

5) Penetration Depth of Metal Coating into Nonwoven Fabric

Figure 7:
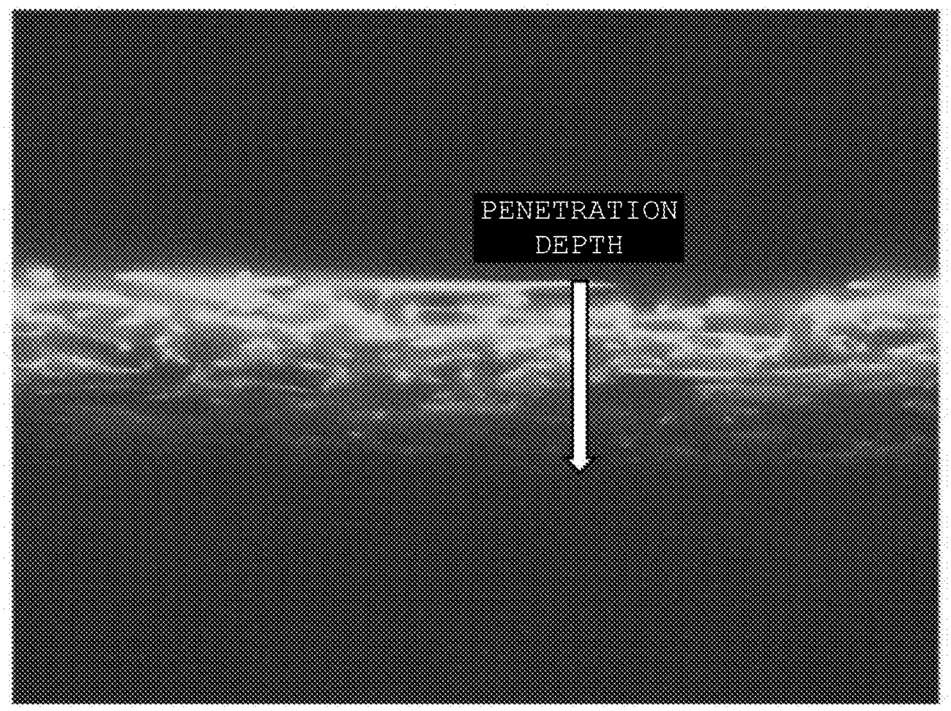
FIG. 7 is an electron micrograph showing a length measurement example of a penetration depth of the metal coating into a nonwoven fabric.

As shown in FIG. 7, the penetration depth of the metal coating into the nonwoven fabric was measured by observing the cross section of the element with a scanning electron microscope (S-4800 by Hitachi, Ltd., acceleration voltage 15 kV, 1 k to 20 k times), acquiring an image by a reflected electron image or element mapping analysis by energy dispersive X-ray spectroscopy. From the obtained image, the penetration depth of the metal coating was measured from the surface of the metal-coated nonwoven fabric into the nonwoven fabric. The sample to be observed was solidified with a resin, and the cross section of the sample was polished so that the fiber layer was exposed. By subjecting the sample to a pretreatment process in this manner, a sectional image of a portion coated with metal can be obtained, and a region where the contrast with the resin can be visually recognized is defined as the penetration depth of the metal coating. The maximum penetration depth of the metal coat into the nonwoven fabric is defined as the penetration depth, because the fiber layer has a porous structure and unevenness.

Preparation Method of Comparative Sample 1

As Comparative Sample 1, an Au thin film (20 nm thick) was formed on a polyimide (PI) film having a thickness of 100 μm by a sputtering method. The PI film had a substantial porosity of 0%, and the characteristics thereof were compared with those of Sample 1 to 5. The element size and the electrode structure are similar to those of the Sample 1.

TABLE 1

| | AVERAGE PORE DIAMETER (μm) | AVERAGE PORE DIAMETER AFTER METAL COATING (μm) | POROSITY (%) | PENETRATION DEPTH OF METAL COATING (μm) | SOUND PRESSURE RATIO |
|---|---|---|---|---|---|
| SAMPLE 1 | 0.58 | 0.54 | 94.8 | 7.5 | 11.7 |
| SAMPLE 2 | 0.57 | 0.53 | 89.9 | 3.7 | 4.5 |
| SAMPLE 3 | 0.56 | 0.52 | 84.6 | 3.3 | 3.1 |
| SAMPLE 4 | 0.49 | 0.45 | 80.3 | 2.0 | 2.2 |
| SAMPLE 5 | 0.43 | 0.39 | 73.6 | 1.3 | 1.6 |
| COMPARATIVE SAMPLE 1 | 0 | — | 0 | — | 1 |

From the results in Table 1, as the pore size and the porosity of the nonwoven fabric constituting the fiber layer increase, the specific surface area of the fiber layer increases, then the acoustic conversion efficiency can be enhanced and the sound pressure is improved.

In addition, since a low heat conductive material such as a polymer is used as the fiber, there is a heat insulating effect in the substrate direction, and the temperature change on the surface of the heating element increases, so that the sound pressure with respect to an unit input power can be increased. As an example, the thermal conductivity of the polyimide is about 0.28 W/m·K, the thermal conductivity of $SiO_2$ (an oxide layer on the surface of the Si substrate) is about 1.3 W/m·K, and the thermal conductivity of the polyimide is lower and the heat insulating effect on the substrate side is higher, so that the sound pressure increases.

Example 2

Sample Preparation Method

A pressure wave generating element was produced by the following method (Comparative Sample 2, Samples 6, 7, 8).

Method for Producing Fiber Membrane of Comparative Sample 2

A polyimide (PI) solution prepared using N, N-dimethylformamide (DMF) as a solvent was used as a spinning solution. The solution concentration was adjusted to 6.5 wt %, and 0.05 wt % of lithium chloride was added to the solution. In addition, tetrabutylammonium chloride, potassium trifluoromethanesulfonate, or the like can be used as an additive.

Using this solution, polyamic acid fiber was spun on an aluminum foil attached to a peripheral surface of a drum collector by an electrospinning method. The drum collector had a diameter of 200 mm and spinning was carried out while rotating at 100 rpm.

The electrospinning conditions were an applied voltage of 29 kV, a nozzle and a collector distance of 14 cm, and a membrane formation time was adjusted so that the thickness of the fiber membrane was about 1 to 80 μm. The average fiber diameter of the produced polyimide was 46 nm.

Method for Producing Fiber Membrane of Samples 6, 7, and 8

When spinning was performed using the electrospinning method, two types of polyimide solutions having different concentrations were simultaneously spun using a multi-nozzle to prepare a fiber membrane. Here, the 6.5 wt % polyimide (PI) solution used in Comparative Sample 2 and a 10 wt % polyimide (PI) solution prepared using N, N-dimethylformamide (DMF) as a solvent were used as spinning solutions.

These two types of polyimide solutions were simultaneously spun on an aluminum foil attached to a peripheral surface of a drum collector by an electrospinning method using a multi-nozzle. At this time, the discharge amounts of the 6.5 wt % polyimide (PI) solution and the 10 wt % polyimide (PI) solution were 2: 1 (Sample 6), 1: 1 (Sample 7), and 1: 2 (Sample 8). The discharge amount can be adjusted by the discharge speed and the number of nozzles. The drum collector had a diameter of 200 mm and spinning was carried out while rotating at 100 rpm.

The electrospinning conditions were an applied voltage of 29 kV, a nozzle and a collector distance of 14 cm, and a membrane formation time was adjusted so that the thickness of the fiber membrane was about 1 to 80 μm. The average fiber diameter of the fiber membrane prepared with the 10 wt % polyimide solution was 126 nm. In this way, a composite fiber membrane having average fiber diameters of 126 nm and 46 nm is obtained.

The produced fiber membrane was peeled off from the aluminum foil and adhered onto a Si substrate (support). Adhesion to the substrate can be performed by applying an adhesive such as epoxy to the substrate in advance or using a double-sided tape or the like. As the substrate, a ceramic substrate such as glass, alumina, zirconia, magnesium oxide, aluminum nitride, boron nitride, or silicon nitride, or a flexible substrate such as a PET film or a polyimide film can be used.

Au distributed in the thickness range of 1 to 40 nm was deposited on the fiber membrane formed on the substrate by a sputtering method. As a method for coating a fiber with metal, a method such as a vapor deposition method, an ion plating method, an atomic layer deposition method, or an electroless plating method may be used. As the metal species, Au, Ag, Cu, Pt, Rh, Pd, Ru, Ni, Ir, Cr, Mo, W, Ti, Al, or the like can be used.

The thickness of the metal coating may be uniform or non-uniform in a circumferential direction of the fiber. For example, the thickness may be increased as the distance from the support is increased. The metal coating has a thickness T1 at a position closest to the support side, and has a thickness T2 at a position farthest from the support side, and T1<T2 may be satisfied. In the form of metal coating on the fiber, for example, as shown in FIG. 3, there may be a portion where the metal coating 22 is not applied on a lower portion close to the support 10 on the peripheral surface of the Fiber 21. This makes it possible to enhance heat generation on the side opposite to the support while suppressing heat generation on the support side inside the fiber layer.

The coating state of the metal-coated fiber (sectional image) can be analyzed as follows. For example, a sample is processed by a focused ion beam (FIB), and the state of coating on fibers can be analyzed by observation with a transmission electron microscope (JEM-F200 manufactured by JEOL Ltd.) and element mapping analysis by energy dispersive X-ray spectroscopy.

The prepared element was processed so as to have a size of 5 mm×6 mm. A pair of electrodes D1 and D2 was formed on both sides of the sample so as to have a dimension of 4 mm×0.8 mm and an inter-electrode distance of 3.4 mm (FIG. 4A). The laminated structure of the electrode was Ti (10 nm thick), Cu (500 nm thick), and Au (100 nm thick) from the support side. The electrodes D1 and D2 may have a comb-shaped electrode structure as illustrated in FIG. 4B in order to adjust an element resistance.

As a method for forming a film of an electrode, vapor deposition, sputtering, an ion plating method, an atomic layer deposition method, electrolytic plating, electroless plating, spray coating, dip coating, printing, and the like can be employed. As the electrode material, Au, Ag, Cu, Pt, Rh, Pd, Ru, Ni, Ir, Cr, Mo, W, Ti, Al, or the like can be used.

The evaluation method is the same as that described in (Example 1).

TABLE 2

| | AVERAGE PORE DIAMETER (μm) | POROSITY (%) | PENETRATION DEPTH OF METAL COATING | SOUND PRESSURE RATIO |
|---|---|---|---|---|
| COMPARATIVE SAMPLE 2 | 0.18 | 86.8 | 1.5 | 8.0 |
| SAMPLE 6 | 0.21 | 88.4 | 2.2 | 9.5 |
| SAMPLE 7 | 0.25 | 91.0 | 3.1 | 11.3 |
| SAMPLE 8 | 0.27 | 91.7 | 4.5 | 12.5 |

From the results in Table 2, by adopting the composite fiber, the pore diameter and the porosity are increased as compared with the single fiber, the acoustic conversion efficiency can be enhanced, and the sound pressure is improved.

In addition, since a low heat conductive material such as a polymer is used as the fiber, there is a heat insulating effect in the substrate direction, and the temperature change on the surface of the heating element increases, so that the sound pressure with respect to an unit input power can be increased.

Example 3

Sample Preparation Method

A pressure wave generating element was produced by the following method (Sample 9).

When spinning was performed using the electrospinning method, two types of polyimide solutions having different concentrations were simultaneously spun using a multi-nozzle to prepare a fiber membrane. Here, the 6.5 wt % polyimide (PI) solution used in Comparative Sample 2 and a 3 wt % polyimide (PI) solution prepared using N, N-dimethylformamide (DMF) as a solvent were used as spinning solutions.

These two types of polyimide solutions were simultaneously spun on an aluminum foil attached to a peripheral surface of a drum collector by an electrospinning method using a multi-nozzle. At this time, the discharge amount of the solution was 1: 1. The discharge amount can be adjusted by the discharge speed and the number of nozzles. The drum collector had a diameter of 200 mm and spinning was carried out while rotating at 100 rpm.

The electrospinning conditions were an applied voltage of 29 kV, a nozzle and a collector distance of 14 cm, and a membrane formation time was adjusted so that the thickness of the fiber membrane was about 1 to 80 μm.

Figure 5:
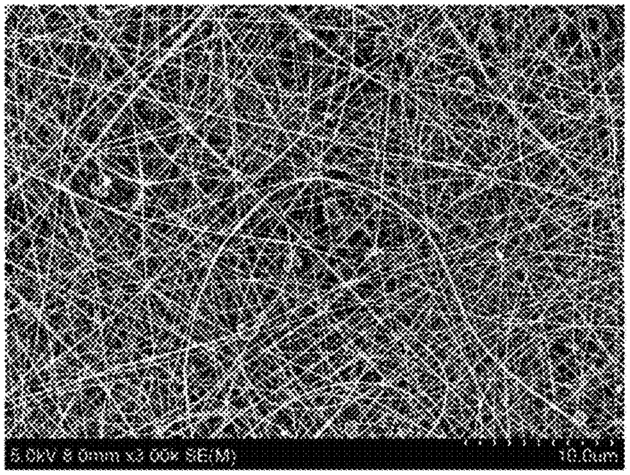
FIG. 5 is an electron micrograph showing an example of a fiber membrane in which beads are generated.

When electrospinning is performed with a 3 wt % polyimide solution, fibers are not formed due to low solution viscosity, and spherical or spheroid beads as shown in FIG. 5 are formed. The size of the beads is 0.5 to 3.0 μm in short diameter. In addition, the beads may have a hollow spherical shape, a long spherical shape, or a shape in which a spherical shape is collapsed.

That is, by simultaneously spinning from the multi-nozzle using the 6.5 wt % polyimide solution and the 3 wt % polyimide solution, a fiber membrane in which beads and polyimide fibers having an average fiber diameter of 46 nm are combined as described above is obtained (FIG. 5).

The produced fiber membrane was peeled off from the aluminum foil and adhered onto a Si substrate (support). Adhesion to the substrate can be performed by applying an adhesive such as epoxy to the substrate in advance or using a double-sided tape or the like. As the substrate, a ceramic substrate such as glass, alumina, zirconia, magnesium oxide, aluminum nitride, boron nitride, or silicon nitride, or a flexible substrate such as a PET film or a polyimide film can be used.

Au distributed in the thickness range of 1 to 40 nm was deposited on the fiber membrane formed on the substrate by a sputtering method. As a method for coating a fiber with metal, a method such as a vapor deposition method, an ion plating method, an atomic layer deposition method, or an electroless plating method may be used. As the metal species, Au, Ag, Cu, Pt, Rh, Pd, Ru, Ni, Ir, Cr, Mo, W, Ti, Al, or the like can be used.

The thickness of the metal coating may be uniform or non-uniform in a circumferential direction of the fiber. For example, the thickness may be increased as the distance from the support is increased. The metal coating has a thickness T1 at a position closest to the support side, and has a thickness T2 at a position farthest from the support side, and T1<T2 may be satisfied. In the form of metal coating on the fiber, for example, as shown in FIG. 3, there may be a portion where the metal coating 22 is not applied on a lower portion close to the support 10 on the peripheral surface of the Fiber 21. This makes it possible to enhance heat generation on the side opposite to the support while suppressing heat generation on the support side inside the fiber layer.

The coating state of the metal-coated fiber (sectional image) can be analyzed as follows. For example, a sample is processed by a focused ion beam (FIB), and the state of coating on fibers can be analyzed by observation with a transmission electron microscope (JEM-F200 manufactured by JEOL Ltd.) and element mapping analysis by energy dispersive X-ray spectroscopy.

The prepared element was processed so as to have a size of 5 mm×6 mm. A pair of electrodes D1 and D2 was formed on both sides of the sample so as to have a dimension of 4 mm×0.8 mm and an inter-electrode distance of 3.4 mm (FIG. 4A). The laminated structure of the electrode was Ti (10 nm thick), Cu (500 nm thick), and Au (100 nm thick)

from the support side. The electrodes D1 and D2 may have a comb-shaped electrode structure as illustrated in FIG. 4B in order to adjust an element resistance.

As a method for forming a film of an electrode, vapor deposition, sputtering, an ion plating method, an atomic layer deposition method, electrolytic plating, electroless plating, spray coating, dip coating, printing, and the like can be employed. As the electrode material, Au, Ag, Cu, Pt, Rh, Pd, Ru, Ni, Ir, Cr, Mo, W, Ti, Al, or the like can be used.

The evaluation method is the same as that described in (Example 1).

TABLE 3

| | AVERAGE PORE DIAMETER (μm) | POROSITY (%) | PENETRATION DEPTH OF METAL COATING (μm) | SOUND PRESSURE RATIO |
|---|---|---|---|---|
| SAMPLE 9 | 0.24 | 90.0 | 2.9 | 10.2 |

From the results in Table 3, by adopting the composite fiber of bead and fiber, the pore diameter and the porosity are increased as compared with the single fiber, the acoustic conversion efficiency can be enhanced, and the sound pressure is improved. This phenomenon is presumed to occur because when the bead was formed in the fiber membrane and sandwiched between fibers provided with the metal coating, the bead acted as a spacer to increase the pore size in the membrane, and heat generation of not only the layer near the surface but also the layer near the substrate was efficiently converted as an acoustic output.

In addition, since a low heat conductive material such as a polymer is used as the fiber, there is a heat insulating effect in the substrate direction, and the temperature change on the surface of the heating element increases, so that the sound pressure with respect to an unit input power can be increased.

As described above, since the fiber layer includes the fiber having the metal coating at least partly provided on the surface thereof, the surface area in contact with air increases, so that the sound pressure is improved. In addition, by using a metal material, an electric resistance of the fiber layer can be set to an appropriate value.

The fiber layer is composed of a fiber membrane having an average pore diameter in the range of 0.1 to 1.0 μm. As a result, a specific surface area of the fiber layer increases, an acoustic conversion efficiency can be enhanced, and the sound pressure is improved.

Although the present invention has been fully described in connection with preferred embodiments with reference to the accompanying drawings, various changes and modifications will be apparent to those skilled in the art. Such modifications and corrections should be understood to be included within the scope of the present invention according to the appended claims as long as they do not depart therefrom.

The present invention is industrially very useful because a pressure wave generating element having improved sound pressure and appropriate electric resistance can be realized.

DESCRIPTION OF REFERENCE SYMBOLS

1: Pressure wave generating element
10: Support
20: Fiber layer
21: Fiber
22: Metal coating
D1, D2: Electrode

The invention claimed is:

1. A pressure wave generating element comprising:
a support; and
a fiber layer on the support and constructed to generate heat by energization, the fiber layer being in the form of a fiber membrane having an average pore diameter within a range of 0.1 to 1.0 μm, and the fiber layer including one or more fibers having a surface at least partly provided with a metal coating,
wherein the support covers an entire surface of one side of the fiber layer.

2. The pressure wave generating element according to claim 1, wherein the one or more fibers have a fiber diameter of 1 nm to 100 nm, and the average pore diameter is 0.2 to 1.0 μm.

3. A pressure wave generating element comprising:
a support; and
a fiber layer on the support and constructed to generate heat by energization, the fiber layer being in the form of a fiber membrane having an average pore diameter within a range of 0.1 to 1.0 μm, and the fiber layer including one or more fibers having a surface at least partly provided with a metal coating,
wherein the one or more fibers include a first fiber having a first fiber diameter Φ1 and a second fiber having a second fiber diameter Φ2 larger than the first fiber diameter.

4. The pressure wave generating element according to claim 3, wherein the first fiber diameter Φ1 is within a range of 1 nm≤Φ1≤100 nm, and the second fiber diameter Φ2 is within a range of 100 nm≤Φ2≤2000 nm.

5. A pressure wave generating element comprising:
a support; and
a fiber layer on the support and constructed to generate heat by energization, the fiber layer being in the form of a fiber membrane having an average pore diameter within a range of 0.1 to 1.0 μm, and the fiber layer including one or more fibers having a surface at least partly provided with a metal coating,
wherein the fiber layer includes a bead, and the bead is sandwiched between adjacent fibers of the one or more fibers.

6. The pressure wave generating element according to claim 1, wherein a thickness of the metal coating increases as a distance from the support increases.

7. The pressure wave generating element according to claim 1, wherein the fiber layer is in the form of a nonwoven fabric.

8. A pressure wave generating element comprising:
a support; and
a fiber layer on the support and constructed to generate heat by energization, the fiber layer being in the form of a fiber membrane having a porosity in a range of 70% to 95%, and the fiber layer includes one or more fibers having a surface at least partly provided with a metal coating.

9. The pressure wave generating element according to claim 8, wherein the one or more fibers have a fiber diameter of 1 nm to 100 nm, and the fiber membrane has a porosity of 87% to 95%.

10. The pressure wave generating element according to claim 8, wherein the one or more fibers include a first fiber having a first fiber diameter Φ1 and a second fiber having a second fiber diameter Φ2 larger than the first fiber diameter.

11. The pressure wave generating element according to claim 10, wherein the first fiber diameter Φ1 is within a range of 1 nm≤Φ1≤100 nm, and the second fiber diameter Φ2 is within a range of 100 nm≤Φ2≤2000 nm.

12. The pressure wave generating element according to claim 8, wherein the fiber layer includes a bead, and the bead is sandwiched between adjacent fibers of the one or more fibers.

13. The pressure wave generating element according to claim 8, wherein a thickness of the metal coating increases as a distance from the support increases.

14. The pressure wave generating element according to claim 8, wherein the fiber layer is in the form of a nonwoven fabric.

15. A method for manufacturing a pressure wave generating element, the method comprising:

forming a fiber membrane on a support, the fiber membrane having a composite fiber formed by spinning using an electrospinning method where two or more kinds of solutions having different concentrations are simultaneously spun to form the fiber membrane made of the composite fiber; and applying a metal coating on the fiber membrane to form a fiber layer, wherein the composite fiber includes a first fiber having a first fiber diameter Φ1 and a second fiber having a second fiber diameter Φ2 larger than the first fiber diameter.

16. The method for manufacturing a pressure wave generating element according to claim 15, wherein the first fiber diameter Φ1 is within a range of 1 nm≤Φ1≤100 nm, and the second fiber diameter Φ2 is within a range of 100 nm≤Φ2≤2000 nm.

17. A method for manufacturing a pressure wave generating element, the method comprising:

forming a fiber membrane on a support, the fiber membrane having a composite fiber formed by spinning using an electrospinning method where two or more types of materials are simultaneously spun to form the fiber membrane made of the composite fiber; and applying the metal coating on the fiber membrane to form a fiber layer, wherein the composite fiber includes a first fiber having a first fiber diameter Φ1 and a second fiber having a second fiber diameter Φ2 larger than the first fiber diameter.

18. A pressure wave generating element comprising:

a support; and a fiber layer on the support and constructed to generate heat by energization, wherein the fiber layer includes a fiber having a surface thereof at least partly provided with a metal coating, and a penetration depth of the metal coating into the fiber layer is 1 μm or more, wherein the fiber layer has an average pore diameter in a range of 0.1 to 1.0 μm, and/or the fiber layer has a porosity in a range of 70% to 95%.

19. A pressure wave generating element comprising:

a support; and a fiber layer on the support and constructed to generate heat by energization, the fiber layer being in the form of a fiber membrane, and the fiber layer including one or more fibers having a surface at least partly provided with a metal coating, wherein the one or more fibers include a first fiber having a first fiber diameter Φ1 and a second fiber having a second fiber diameter Φ2 larger than the first fiber diameter.

20. A pressure wave generating element comprising:

a support; and a fiber layer on the support and constructed to generate heat by energization, the fiber layer being in the form of a fiber membrane, and the fiber layer including one or more fibers having a surface at least partly provided with a metal coating, wherein the fiber layer includes a bead, and the bead is sandwiched between adjacent fibers of the one or more fibers.

* * * * *